US008555158B2

(12) United States Patent
Yao et al.

(10) Patent No.: US 8,555,158 B2
(45) Date of Patent: *Oct. 8, 2013

(54) DYNAMICALLY UPDATING WEBPAGE STYLE

(75) Inventors: Rose Yao, San Francisco, CA (US); Jared M. Jacobs, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 307 days.

This patent is subject to a terminal disclaimer.

(21) Appl. No.: 13/045,483

(22) Filed: Mar. 10, 2011

(65) Prior Publication Data

US 2011/0161803 A1  Jun. 30, 2011

Related U.S. Application Data

(63) Continuation of application No. 11/427,774, filed on Jun. 29, 2006, now Pat. No. 7,908,551.

(51) Int. Cl.
  *G06F 17/00* (2006.01)
(52) U.S. Cl.
  USPC ............................ 715/236; 715/234; 715/235
(58) Field of Classification Search
  USPC .......................................... 715/235, 234, 236
  See application file for complete search history.

(56) References Cited

U.S. PATENT DOCUMENTS

| 6,941,521 | B2 | 9/2005 | Lin et al. ....................... 715/762 |
| 7,200,820 | B1 | 4/2007 | Stephens ....................... 715/838 |
| 7,346,842 | B1 * | 3/2008 | Hayton et al. ................. 715/234 |
| 7,383,498 | B1 * | 6/2008 | Hickl et al. .................... 715/235 |
| 7,421,278 | B2 | 9/2008 | Srinivasan et al. .......... 455/456.3 |
| 2002/0165881 | A1 | 11/2002 | Shelton ......................... 707/526 |
| 2003/0216929 | A1 | 11/2003 | Brockway et al. ................. 705/1 |
| 2004/0111670 | A1 | 6/2004 | Sasakuma et al. ............. 715/513 |
| 2006/0069790 | A1 | 3/2006 | Surana .......................... 709/230 |
| 2006/0212806 | A1 * | 9/2006 | Griffin et al. ................. 715/523 |
| 2007/0239726 | A1 * | 10/2007 | Weiss et al. ..................... 707/10 |

OTHER PUBLICATIONS

Google Inc., International Preliminary Report on Patentability, PCT/US2007/072401, Jan. 6, 2009, 6 pgs.
Google Inc., Office Action, Chinese Patent Application 200780032097.2, Oct. 26, 2011, 8 pgs.
Google Inc., Office Action, European Patent Application 07812440.1, Apr. 28, 2009, 3 pgs.
W3C, "Cascading Style Sheets, Level 2 CSS2 Specification," http://www.w3.org/TR/REC-CSS2/, May 12, 1998, 338 pages.
International Search Report and Written Opinion for International Application No. PCT/US2007/072401, mailed Jan. 28, 2008, 11 pages.

(Continued)

*Primary Examiner* — Chau Nguyen
(74) *Attorney, Agent, or Firm* — Morgan, Lewis & Bockius LLP

(57) ABSTRACT

A computer implemented method of presenting webpages at a client device or system, having one or more processors and memory storing one or more programs for execution by the one or more processors, includes, at a first time, presenting a first webpage having a first style, and in response to a refresh request at a second time, presenting a second webpage having a second style that is distinct from the first style. The first style and second style are determined in accordance with a value of a user selected variable, and the value automatically changes over time independent of user action. Furthermore, the user selected variable has a first value at the first time and a second value distinct from the first value at the second time.

27 Claims, 8 Drawing Sheets

(56) References Cited

OTHER PUBLICATIONS

Sowden, P., "Alternative Style: Working with Alternative Style Sheets," http://www.alistapart.com/articles/alternative/, ISSN: 1534-0295, Nov. 2, 2001, 6 pages.

Google Inc., Notification on the Grant of Patent Right for Invention, CN 200780032097.2, Feb. 21, 2013, 1 pg.

Google Inc., Office Action, CN 200780032097.2, Aug. 2, 2012, 3 pgs.

* cited by examiner

```
                                            ┌─ 320
<body>
 <p>Rotating Style Sheets</p>
 ...
 <script>
  rotate("skin-1.css"); ─── 322
 </script>
 ...
</body>
```

Figure 3B

```
                                                ┌─ 330
<html>
<head>
 <title>Rotating Style Sheets</title>              ┌─ 332
 <link rel="stylesheet" type="text/css" href="main.css" />
 <link id="skin" rel="stylesheet" type="text/css" href="skin-0.css" /> ─── 334
 <script type="text/javascript">
  function rotate(skinUrl) {
    document.getElementById("skin").href = skinUrl; ─── 336
  }
 </script>
</head>
<body>
 <p>Rotating Style Sheets</p>
 ... application code ... rotate("skin-1.css") ...
</body>
</html>
```

Figure 3C

```
                                                    ┌─ 340
 <html>
 <head>
  <title>Rotating Style Sheets</title>
  <link rel="stylesheet" type="text/css" href="main.css" />  ─ 342
  <style type="text/css" id="skin">
    @import url(skin-0.css);  ─── 344
  </style>
  <script type="text/javascript">
   function rotate(skinUrl) {
     document.getElementById("skin").innerHTML = "@import  ─── 346
 url(" + skinUrl + ");";
   }
  </script>
 </head>
 <body>
  <p>Rotating Style Sheets</p>
  ... application code ... rotate("skin-1.css") ...
 </body>
 </html>
```

Figure 3D

```
                                    ┌─ 350
function AddStyleLinkToWindow(win, url) {
  var e = win.document.createElement("LINK");
  e.setAttribute("rel", "stylesheet");
  e.setAttribute("type", "text/css");
  e.setAttribute("href", url);
  // The document's first child is the head element.
  win.document.documentElement.firstChild.appendChild(e);
}
```

Figure 3E

DYNAMICALLY UPDATING WEBPAGE STYLE

RELATED APPLICATION

This is a continuation of U.S. patent application Ser. No. 11/427,774, filed Jun. 29, 2006, now U.S. Pat. No. 7,908,551 entitled "Dynamically Generating Customized User Interfaces," which is hereby incorporated by reference herein in its entirety.

TECHNICAL FIELD

The disclosed embodiments relate generally to customizing graphical user interfaces of computer application. In particular, the embodiments relate to customizing user interfaces of online applications.

BACKGROUND

Computer users are generally able to customize the graphical user interfaces of computer applications. Additionally, many online applications, such as web-based email applications allow users to customize their interfaces or appearance of the online application with different colors, fonts, background images, line widths and the like. These customized appearances are sometimes referred to as skins. For example, with certain online applications, users may select one color from a menu of different colors to be applied to the appearance of their online application. Each time the user logs onto that application or website, the skin of that website appears with the color they have selected. The customized appearance remains the same as the content on the online application is changed and updated.

SUMMARY

A computer implemented method of presenting webpages at a client device or system, having one or more processors and memory storing one or more programs for execution by the one or more processors, includes, at a first time, presenting a first webpage having a first style, and in response to a refresh request at a second time, presenting a second webpage having a second style that is distinct from the first style. The first style and second style are determined in accordance with a value of a user selected variable, and the value automatically changes over time independent of user action. Furthermore, the user selected variable has a first value at the first time and a second value distinct from the first value at the second time.

A computer implemented method of presenting an online application, includes, at a first time, receiving and presenting a first webpage of the online application having a first style, and at a second time, receiving and presenting a second webpage of the online application having a second style that is distinct from the first style. In some embodiments, the first style and second style are in accordance with a user selected variable and the user selected variable has first and second distinct values at the first and second times, respectively. In some embodiments, the first and second distinct values are automatically determined in accordance with a user profile.

A computer implemented method of presenting an online application, is performed at a first client device and at a second client device. The first client device, at a first time, receives and presents a first webpage of the online application having a first style and at a second time, receives and presents a second webpage of the online application having a second style that is distinct from the first style. The first style and second style are determined in accordance with a variable selected by a first user, and the variable selected by the first user has first and second distinct values at the first and second times, respectively. The second client device, at a third time, receives and presents a third webpage of the online application having a third style, and, at a fourth time, receives and presents a fourth webpage of the online application having a fourth style that is distinct from the third style. The third style and fourth style are in accordance with a variable selected by a second user, who is distinct from the first user, and the variable selected by the second user is distinct from the variable selected by the first user. The variable selected by the second user has third and fourth distinct values at the third and fourth times, respectively.

A system (e.g., a client device) for presenting an online application includes memory, one or more processors, and one or more modules stored in memory and configured for execution by the one or more processors. The modules include instructions to, at a first time, receive and present a first webpage of the online application having a first style, and to, at a second time, receive and present a second webpage of the online application having a second style that is distinct from the first style. The first style and second style are in accordance with a user selected variable and the user selected variable has first and second distinct values at the first and second times, respectively.

A computer program product for use in conjunction with a computer system, the computer program product includes a computer readable storage medium and a computer program mechanism embedded therein. The computer program mechanism includes instructions for: at a first time, receiving and presenting a first webpage of the online application having a first style; and at a second time, receiving and presenting a second webpage of the online application having a second style that is distinct from the first style. The first style and second style are in accordance with a user selected variable and the user selected variable has first and second distinct values at the first and second times, respectively.

A computer implemented method of presenting an online application, includes, at a first time, sending to a client a first webpage of the online application having a first style, and at a second time, sending to the client a second webpage of the online application having a second style distinct from the first style. In some embodiments, the first style and second style are in accordance with a user selected variable and the user selected variable has first and second distinct values at the first and second times, respectively. In some embodiments, the first and second distinct values are automatically determined in accordance with a user profile of a user of the client device.

A computer implemented method of presenting an online application, includes, at a first time, sending a first webpage of the online application having a first style, to a first client device, and at a second time, sending a second webpage of the online application having a second style that is distinct from the first style, to the first client device. The first style and second style are in accordance with a variable selected by a first user, and the variable selected by the first user has first and second distinct values at the first and second times, respectively. The method further includes, at a third time, sending a third webpage of the online application having a third style, to a second client; and at a fourth time, sending a fourth webpage of the online application having a fourth style that is distinct from the third style, to the second client. The third style and fourth style are in accordance with a variable selected by a second user. The second user is distinct from the first user and the variable selected by the second user is distinct from the variable selected by the first user. The variable selected by the second user has third and fourth distinct values at the third and fourth times, respectively.

A system (e.g., an application server) for presenting an online application includes memory, one or more processors, and one or more modules stored in memory and configured for execution by the one or more processors. The modules include instructions to, at a first time, send to a client a first webpage of the online application having a first style, and to, at a second time, send to the client a second webpage of the online application having a second style distinct from the first style. The first style and second style are in accordance with a user selected variable and the user selected variable has first and second distinct values at the first and second times, respectively.

A computer program product for use in conjunction with a computer system, the computer program product includes a computer readable storage medium and a computer program mechanism embedded therein. The computer program mechanism includes instructions for: at a first time, sending to a client a first webpage of the online application having a first style; and at a second time, sending to the client a second webpage of the online application having a second style distinct from the first style. The first style and second style are in accordance with a user selected variable and the user selected variable has first and second distinct values at the first and second times, respectively.

BRIEF DESCRIPTION OF THE DRAWINGS

FIG. 3B illustrates a webpage, including JavaScript instructions for applying a rotating set of style sheets to the webpage.

FIG. 3C illustrates exemplary JavaScript source code for dynamically changing the style sheet applied to a webpage.

FIG. 3D illustrates exemplary source code using a cascading style sheet (CSS) import operation to change the secondary or differential style sheet applied to a webpage.

FIG. 3E is an exemplary source code of a JavaScript function that adds a new style sheet to a web page using a methodology based on the document object model (DOM).

Like reference numerals refer to corresponding parts throughout the drawings.

DETAILED DESCRIPTION OF THE INVENTION

Figure 1:
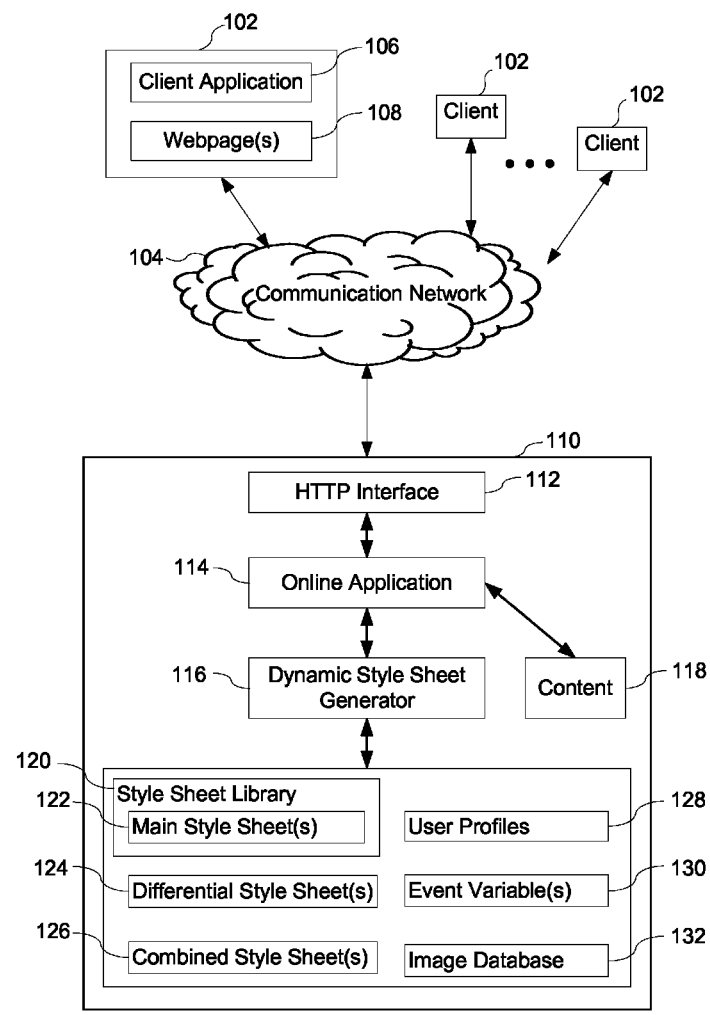
FIG. 1 is a diagram illustrating a distributed system for dynamically generating style sheets for web pages.

FIG. 1 is a diagram illustrating a distributed system for dynamically generating webpages with dynamically generated or dynamically selected style sheets (sometimes called "skins"). One or more computers or devices (hereinafter, "clients" or "client devices") 102 may be connected to a communication network 104. The client 102 may be any of a number of devices (e.g. a computer, an internet kiosk, a personal digital assistant, a cell phone, a desktop computer, or a laptop computer) and may include one or more client applications 106. The client application 106 may permit a user to view webpages 108 or other documents or information. The client application 106 may be a software application that permits a user to interact with the client 102 and/or network resources to perform one or more tasks. For example, the client application 106 may be a web browser (e.g., Firefox, Internet Explorer, or Safari) or other type of application that permits a user to search for, browse, and/or use resources, such as one or more webpages on the client 102 and/or accessible via the communication network 104. The client application 106 may also include an email application (e.g., Outlook, Lotus Notes, Entourage, or Eudora).

The communication network 104 may be any local area network (LAN) and/or wide area network (WAN), such as an intranet, an extranet, the Internet or a combination of such networks. It is sufficient that the communication network 104 provides communication capability between the clients 202 and the server 110. In some embodiments, the communication network 104 uses HyperText Transport Protocol (HTTP) to transport information using the Transmission Control Protocol/Internet Protocol (TCP/IP). The HTTP permits client computers to access various resources available via the communication network 104. The various embodiments of the invention, however, are not limited to the use of any particular protocol. The term "resource" as used throughout this specification refers to any piece of information or service that is accessible via a Uniform Resource Locator (URL) and can be, for example, a webpage, a text or word processing document, an email message, a transcribed voice message, a database, an image, or a computational object.

The communication network 104 may be connected to an information server 110. The server 110 may include an HTTP interface 112, one or more online applications 114, and a dynamic style sheet generator 118.

The HTTP interface 112 facilitates communication between the communication network 104 and the online application 114. The online applications 114 may be configured to send and receive content 118. The online application 114 may be a webmail application or other type of personalized online application that is utilized in displaying various content 118.

The dynamic style sheet generator 116 may include or be connected to the following: a style sheet library 120 that includes one or more main style sheets 122 and one or more differential style sheets 124; one or more user profiles 128, one or more event variables 130; and an image database 132. The dynamic style sheet generator 116 generates dynamic style sheets in accordance with one or more user selected variables, which may be stored in the user profiles 128. Alternately, the dynamic style sheet generator 116 selects a dynamic style sheet from a set of previously generated dynamic style sheets stored in the library 120, in accordance with one or more user selected variables. Optionally, a main style sheet 124 may be combined with one or more differential style sheets 124 to produce a combined style sheet 126 in accordance with the user selected variables. However, in some embodiments, a respective webpage produced by the server 110 references both a main style sheet and a differential style sheet, and therefore the dynamic style sheet generator 116 need not generate combined style sheets in these embodiments. The various style sheets are independent of the webpage content 118 that is sent and received.

In some embodiments, the user selected variable determines what type of event variables 130 will be required. The event variables 130 may be updated as an event changes or as events occur. For example, if a user selects "weather" (at a particular location, for example, in a particular city or at a particular postal code) as a variable for their skin, the event variables 130 may be temperature, precipitation, or humidity level. At predetermined times, one or more event variables 130 may be updated with the correct and current information accordingly, in order to produce the appropriate skin. In some embodiments, the dynamic style sheet generator 116 may access a list of the URLs for images (in the image database) that may be included in the webpage skin.

Figure 2A:
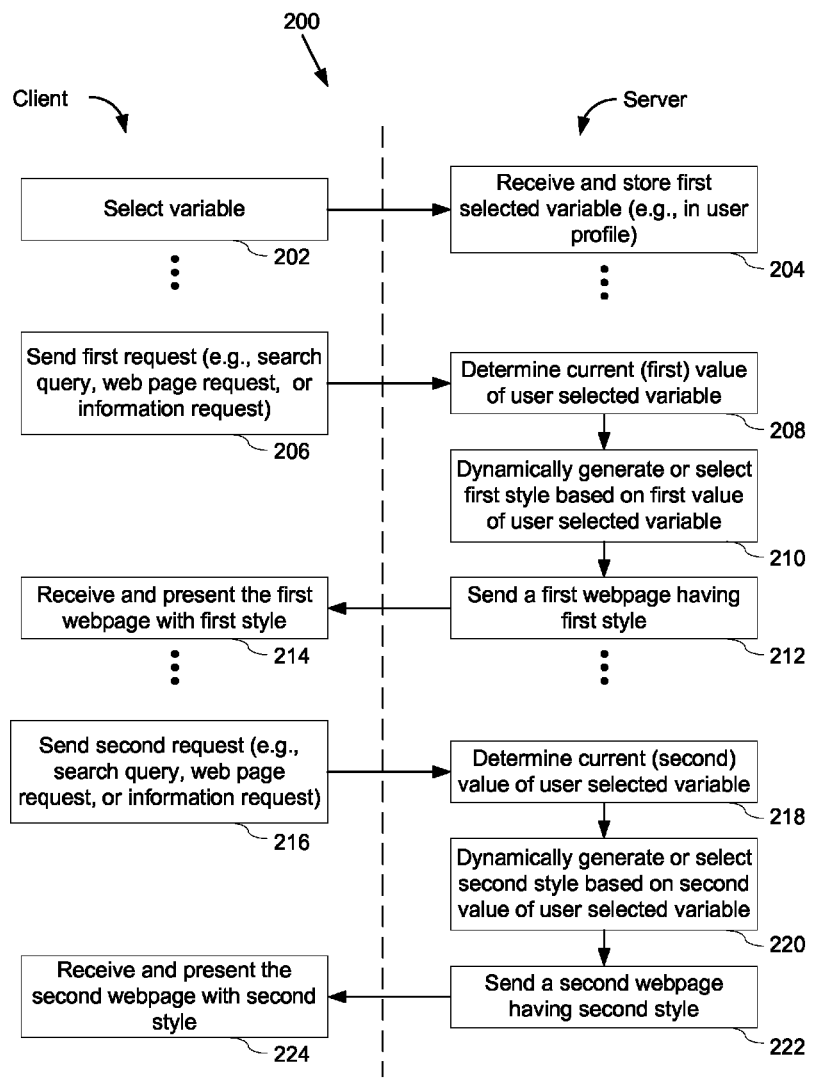
FIG. 2A is a flow diagram illustrating a process for dynamically generating style sheets for web pages in accordance with some embodiments of the present invention.

FIG. 2A is a flow diagram illustrating a process 200 for dynamically generating webpage styles or skins in accordance with some embodiments of the present invention. A user of a client may select a variable 202 in order to customize the user interface of a webpage. The variable selected by the user may include, but is not limited to, date, time, weather, temperature, season, holiday, and stock market activity. A server then receives and stores the first selected variable 204. In some embodiments, this variable may be stored in the user profile 128 (as shown in FIG. 1). In some embodiments, the user selected variable is independent of the content of the webpages being displayed, and thus the values of the variable and the resulting style sheets are also independent of the content of the webpages being displayed.

After the variable is selected (202), the user of the client may then send a first request to the server 206. In some embodiments, the initial request may be a search query, a request for a new webpage, or some type of information request. The server then determines a current first value of the user selected variable 208 and generates (or selects) a first style (sometimes herein called a first dynamic style) based on the first value of the user selected variable 210. The server sends the first webpage with the first style to the client 212. The client then receives and presents the first webpage with the first style 214.

The user may then send a second request 216. In some embodiments, the request may be a search query, a request for a new webpage, or some type of information request. Additionally, in some embodiments, the request may be a request to refresh the appearance of the first webpage. The refresh request may be automatically sent without any user action required, or it may be sent in response to an explicit user action. The server then determines the second value of the user selected variable 218 and dynamically generates or selects a second style based on the second value of the user selected variable 220. The second webpage having the second style is then sent to the client 222. The client therefore may receive and present the webpage with the second style 224.

In some embodiments, when request 216 is a request for a new or updated style sheet, or alternately a refresh request, operation 222 is replaced with operations for sending the generated or selected style sheet to the requesting client, without sending a new or updated webpage, and operation 224 is replaced with re-displaying the previously downloaded webpage with the newly received style sheet. As a result, the appearance of the webpage will change at the client without the content of the webpage changing. If the user continues to view the same webpage for a sufficiently long period of time, operations 216 through 224 may be repeated multiple times, with the appearance of the webpage changing multiple times. As noted above, the styles or style sheets generated or selected by this process are often independent of the webpage content.

For example, in some embodiments, a user may select weather as the variable for a given webpage. When a user sends a request to present that webpage, the server must obtain information regarding what the weather is in the user's location. If it is raining, the server may utilize the dynamic style sheet generator 116 (FIG. 1) to generate a webpage with graphics displaying rain. In some embodiments, a refresh operation may be performed to obtain current information to update the displayed webpage. In some embodiments, the refresh by the client may be generated manually by the user, or the refresh may be generated by code in the webpage that is executed by the browser or the client.

In some embodiments, a refresh request may be distinct from reloading the entire webpage. A refresh request may be a request for new information, which may include content information, style information, or another type of information. In some embodiments, the style of the webpage may be refreshed without refreshing the content of the webpage. For example, if there is no new content, but the user selected variable has changed in value, the style may be updated without the content being updated. As shown in FIG. 1, and as stated above, the various style sheets are independent of content 118.

In some embodiments, if there is a persistent connection between the server and the client, the server may send style sheet and/or content updates to the client even in the absence of a request from the client.

Figure 2B:
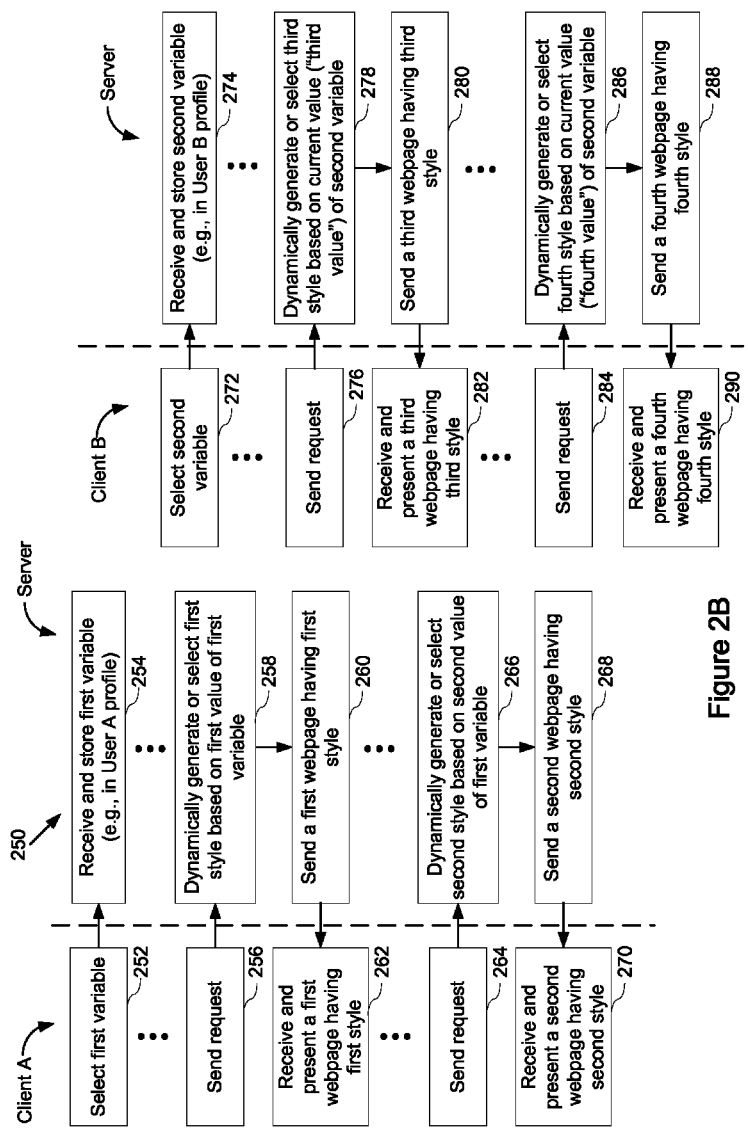
FIG. 2B is a flow diagram illustrating a process for dynamically generating style sheets for web pages in accordance with some embodiments of the present invention.

FIG. 2B is a flow diagram illustrating a process 250 for dynamically generating or selecting webpage styles or skins in accordance with some embodiments of the present invention. This flow diagram illustrates a process used when an information server or application server sends webpages with dynamically determined styles to more than one client. The clients may access the server simultaneously, or during overlapping time periods, to obtain webpages with dynamically determined styles and/or to update the styles of webpages previously downloaded from the server. A user of Client A (User A) selects a first variable 252, which is received and stored by the server 254. In some embodiments, the server stores the variable in User A's profile 128 (as shown in FIG. 1). At a time after the variable has been selected by the user and stored by the server, the user of the Client A sends a first request to the server. The request may be a search query, a request for a new webpage, or another type of information request. The server then dynamically generates or selects a first style based on a first value (e.g., a current value) of the first variable 258 and sends a first webpage having the first style 250 to Client A. The first style (and the other styles mentioned below) may either be dynamically generated based on the first value (e.g., by dynamically creating a style sheet file) or by selecting one of a set of predefined or previously generated style sheet files. Client A receives and presents the first webpage having the first style 262.

At a later time, the user of Client A sends a second request 264 to the server. As stated above, in some embodiments, the second request may be a search query, a request for a new webpage, or another type of information request. In other embodiments, the request may be a request to refresh the appearance of the first webpage, which may be user initiated, or automatic. The server then dynamically generates or selects a second style based on a second value (e.g., a new current value) of the first variable 266 and sends a second webpage having the second style 268 to Client A. Client A receives and presents the second webpage having the second style 270. In some embodiments, instead of requesting a second webpage, the client (e.g., Client A) requests and receives a new style sheet, which is applied to the webpage without downloading or refreshing the webpage content.

Similarly, a user of Client B (User B) selects a variable 272. The variable selected by the user of Client B is received and stored by the server 274. In some embodiments, the variable may be stored in User B's profile, which is separate and distinct from the profile of User A (above). At a later time, the User B sends a request to the server 276. In some embodiments, the request may be a search query, a request for a new webpage, or another type of information request. In response to the request, the server dynamically generates or selects a third dynamic style based on a current value (herein called the "third value") of the second variable 278. The current value of the second variable is herein called a "third value" to distinguish it from the aforementioned first and second values of the first variable. The server sends the third webpage have the third style 280 to Client B. Client B receives and presents the third webpage having the third style 282.

At yet a later time, User B sends another request 284. In some embodiments, the request may be a search query, a request for a new webpage, or another type of information request. In other embodiments, the request may be a request to refresh the appearance of the third webpage, which may be user initiated, or automatic. In response to the request (284), the server dynamically generates or selects a fourth style based on a current value (herein called the "fourth value") of the second variable 286 and sends a fourth webpage having the fourth style 288 to Client B. Client B receives and presents the fourth webpage having the fourth style 290. In some embodiments, when request 264 or 284 is a request for a new or updated style sheet, or alternately a refresh request, operations 266 or 288 are replaced with operations for sending the generated or selected style sheet to the requesting client, without sending a new or updated webpage.

Figure 3A:
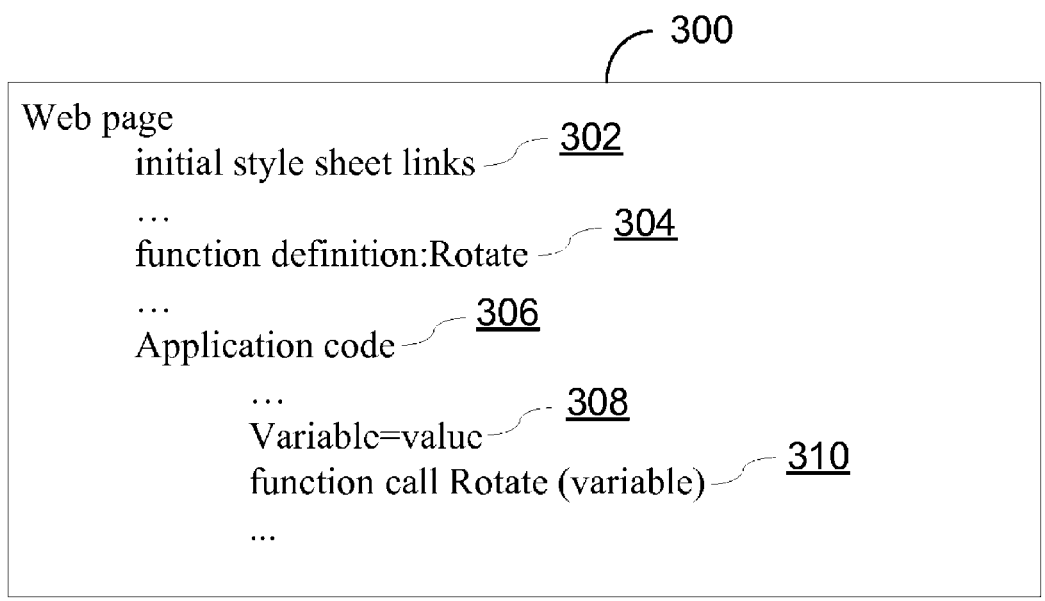
FIG. 3A illustrates a webpage with a function definition and a function call for rotating through a set of style sheets that are applied to the webpage.

FIGS. 3A to 3E illustrate how a method of dynamically generating customized user interfaces may be implemented. FIG. 3A is a generic example of instructions 300 in a webpage for implementing customized skins. The instructions 300 are arranged or ordered to that one or more initial style sheet links 302 are invoked and a function is defined 304. In the example shown in FIG. 3A, the function is called "Rotate." In this example, application code 306 for performing various functions is also established and at least a portion of the application code is executed. As part of the application code, a variable may be defined and assigned a current value 308. The current value assigned to the variable 308 may change from time to time. For example, the variable may be a user selected variable whose value depends on a condition external to the client. In addition, the previously defined function (see 304) may be called by the application code from time to time, using the current value of the variable as a parameter of the function call 310.

FIG. 3B illustrates exemplary HTML source code for a webpage, including a function call. As illustrated in this figure, the "skin-1.css" cascading style sheet may be initialized from the main source code of a web page. While the example in FIG. 3B does not show a definition for the rotate( ) function, examples of the rotate( ) function are provided in FIGS. 3C and 3D. In some embodiments, other defined style sheets may be invoked (i.e., applied when displaying the webpage) from time to time during the display of the webpage.

FIG. 3C depicts exemplary HTML source code 330 for a webpage, including JavaScript instructions for invoking a rotating set of "differential" style sheets. Within the code, a main style sheet is first established 332. In order to change or refresh the skin or appearance, another style sheet, herein called a differential style sheet, is called upon using the appropriate uniform resource locator (URL) 334. To the extent that the differential style sheet has any of the same parameters as the main style sheet, it overrides the those parameters. On the other hand, to the extent that the main and different style sheet specify different style parameters, the two style sheets are complementary. Whenever the rotate function is called (e.g., by JavaScript instructions in the body of the HTML source code 330 for the webpage), another differential style sheet is invoked 336 to further refresh the appearance of the webpage.

FIG. 3D shows exemplary source code 340 using URL import operations (e.g., implemented using "@import" HTML commands) to import a sequence of style sheets. This example achieves the same results as the example in FIG. 3C, but utilizes a different technique. Similar to the source code in FIG. 3C, a main style sheet is first established 342. The URL of a differential or secondary style sheet is specified in an HTML "@import" command, causing the specified style sheet to be imported 344 to the client and applied to the webpage. The differential or secondary style sheet is assigned an identifier, id="skin" in this example, which enables the style sheet to be replaced by a new style sheet. A function (called the rotate function in this example) for importing other style sheets to supersede the previously imported differential or secondary style sheet is defined at 346. The rotate function may be called by instructions in the body of the HTML source code 340 for the webpage. Each time the rotate function is called (e.g., by JavaScript instructions in the body of the HTML source code 340 for the webpage), the new style sheet replaces the previously imported style sheet that was assigned the identifier id="skin" and the style items in the newly imported style sheet are used by the client device when presenting the webpage.

FIG. 3E shows exemplary source code of a JavaScript function that adds a style sheet to a webpage using the document object model (DOM). In this example, the function inserts a link to a style sheet into the header of a webpage. The DOM provides an application programming interface (API) to access and modify the content, structure, and style of a document. In this example, the function adds a new element to the DOM structure of a webpage. The new element added to the webpage is an HTML link having attributes of rel="stylesheet", type="text/css" and href=url, where "url" is the input parameter of the function. The "url" in the HTML link may be a URL selected in accordance with a user specified variable, as described above. Alternately, the "url" in the HTML link may be a fixed value that invokes a style sheet generation function or procedure in the server.

In some embodiments, the creation or replacement of a link to a style sheet in the HTML code for a webpage results in an HTML request to the server, specifying the URL of the style sheet being requested. An HTML request with that URL may be treated by the server as a function or procedure call to a style sheet generation function or procedure. The function or procedure generates or selects a style sheet in accordance with a current value of a variable identified in the user profile of the user associated with the requesting client (e.g., the user may be associated with the client by a successful login with the server).

Figure 4:
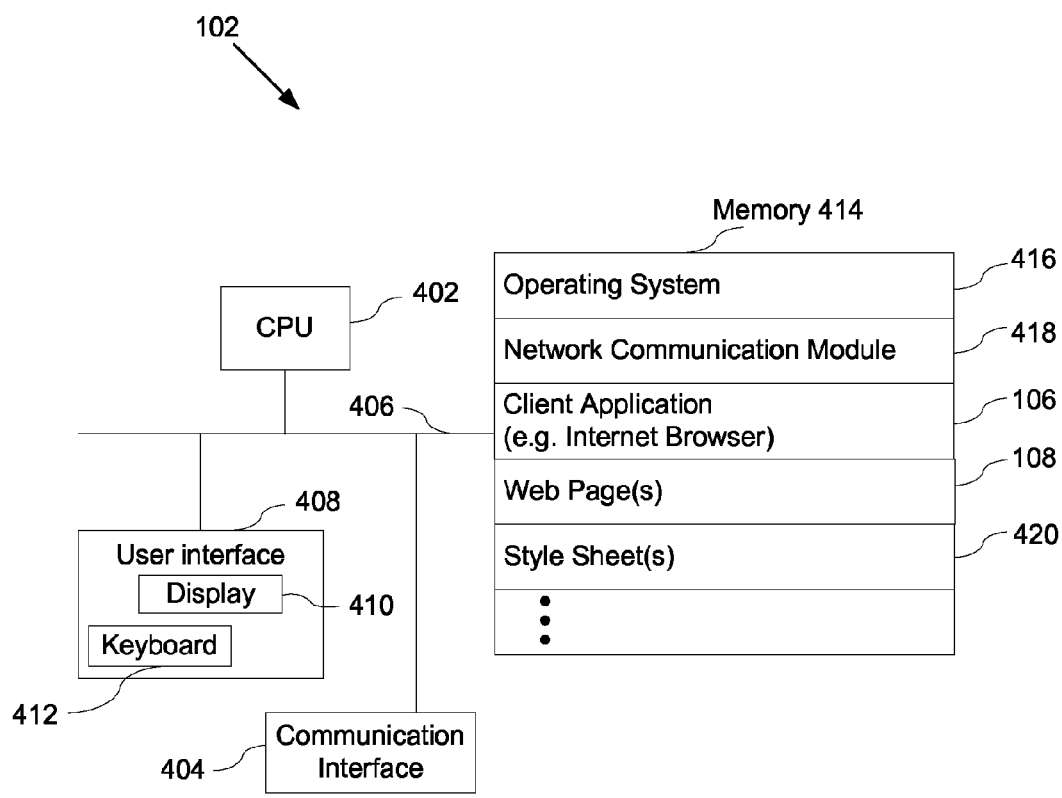
FIG. 4 is a block diagram illustrating an exemplary client in accordance with some embodiments of the present invention.

FIG. 4 is a block diagram illustrating an exemplary client 102 in accordance with some embodiments of the present invention. The client 102 typically includes one or more processing units (CPU) 402, one or more network or other communication interfaces 404, user interface 408, memory 414, and one or more communication buses 406 for interconnecting these parts. The communication buses 406 may include circuitry (sometimes called a chipset) that interconnects and controls communications between system components. The user interface 408 may include a display 410, a keyboard 412 and possibly other components as well.

Memory 414 includes high-speed random access memory, such as DRAM, SRAM, DDR RAM, or other random access solid state memory devices; and may include non-volatile memory, such as one or more magnetic disk storage devices, optical disk storage devices, or other non-volatile solid state storage devices. Memory 414 may optionally include one or more storage devices remotely located from the CPU(s) 402. Memory 414, or one or more of the storage devices (e.g., one or more non-volatile storage devices) in memory 414, includes a computer readable storage medium. In some embodiments, memory 414 or the computer readable storage medium of memory 414 stores the following programs, modules, and data structures, or a subset thereof:

- an operating system 416 that includes procedures for handling various basic system services and for performing hardware dependent tasks;
- a network communication module 418 that is used for connecting the client 102 to other computers via the one or more communication network interfaces 404 and one or more communication networks, such as the Internet, other wide area networks, local area networks, metropolitan area networks, and so on;
- a client application 106 that can permit a user to interact with client 102 and/or network resources to perform one or more tasks, as described above;
- one or more webpages 108 that may be displayed on the client application 106; and
- one or more style sheets 420.

In some embodiments, the webpages 108 may display a webmail application or other type of online application. As described above, the webpages 108 may reference a rotating set of style sheets, or a sequence of style sheets, generated or selected in accordance with a user selected variable. In some embodiments, the one or more style sheets 420 may be locally cached for use by the client application 106. In other embodiments, the style sheet(s) 420 may be downloaded from the server 110 each time a webpage is downloaded or refreshed.

Figure 5:
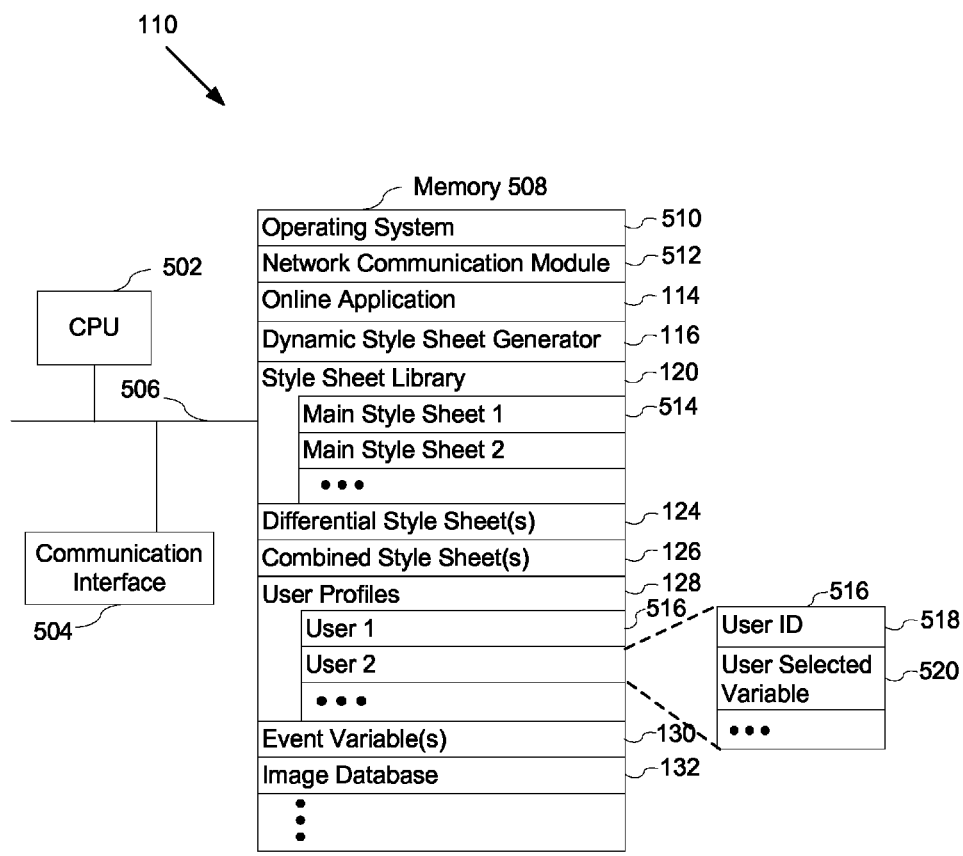
FIG. 5 is a block diagram illustrating an exemplary information server in accordance with some embodiments of the present invention.

FIG. 5 is a block diagram illustrating an exemplary information server 110 in accordance with some embodiments of the present invention. The server 110 typically includes one or more processing units (CPUs) 502, one or more network or other communication interfaces 504, memory 508, and one or more communication buses 506 for interconnecting these parts. The communication buses 506 may include circuitry (sometimes called a chipset) that interconnects and controls communications between system components.

Memory 508 includes high-speed random access memory, such as DRAM, SRAM, DDR RAM, or other random access solid state memory devices; and may include non-volatile memory, such as one or more magnetic disk storage devices, optical disk storage devices, or other non-volatile solid state storage devices. Memory 508 may optionally include one or more storage devices remotely located from the CPU(s) 502. Memory 508, or one or more of the storage devices (e.g., one or more non-volatile storage devices) in memory 508, includes a computer readable storage medium. In some embodiments, memory 508 or the computer readable storage medium of memory 508 stores the following programs, modules and data structures, or a subset thereof:

- an operating system 510 that includes procedures for handling various basic system services and for performing hardware dependant tasks;
- a network communication module 512 that is used for connecting the client 102 to other computers via the one or more communication network interfaces 504 and one or more communication networks, such as the Internet, other wide area networks, local area networks, metropolitan area networks, and so on;
- an online application 114;
- a dynamic style sheet generator 116;
- a style sheet library 120, including one or more main style sheets 122, and one or more differential style sheets 124;
- one or more combined style sheets 126 (optional, as explained above);
- user profiles 128 for storing user information;
- one or more event variables 130; and
- an image database 132.

In some embodiments, the online application 114 may be a webmail application or other type of online application. The dynamic style sheet generator 116 generates or selects dynamic style sheets in accordance with one or more user selected variables, as explained above.

The style sheet library 120 may store main style sheets 122. The main style sheets 122 may be combined with differential style sheets 124 to produced combined style sheets 126. Alternately, webpages produced by the online application 114 may reference both a main style sheet and one or more differential style sheets 124. The various style sheets are utilized by the dynamic style sheet generator 116 to send and create style sheets in accordance with the user selected variables.

The user profiles database 128 stores information specific to each user. In some embodiments, an individual user profile 516 may include a user ID 518, one or more used selected variables 520, and other information specific to the user. Once a user ID 516 has been assigned to a user, the user may log onto a website or online application using their user ID 516. The user then may select a variable (user selected variable 520) in order to customize the appearance of the website or online application. The user selected variable 520 is then stored in the user profile 516 for that particular user.

Each of the above identified elements in FIGS. 4 and 5 may be stored in one or more of the previously mentioned memory devices. The applications, functions, modules and operating systems shown in these Figures correspond to sets of instructions for performing the functions described above. The above identified modules or programs (i.e. set of instructions) need not be implemented as separate software programs, procedures or modules, and thus various subsets of these modules may be combined or otherwise rearranged in various embodiments. In some embodiments, memory 416 and/or memory 508 may store a subset of the modules and data structures identified above. Furthermore memory 416 and/or memory 508 may store additional modules and data structures not described above.

Although FIGS. 4 and 5 show respectively a client 102 and a server 110, the figures are intended more as functional descriptions of the various features which may be present in a client and a set of servers than as a structural schematic of the embodiments described herein. In practice, and as recognized by those of ordinary skill in the art, items shown separately could be combined and some items could be separated. For example, some items shown separately in FIG. 5 could be implemented on a single server and single items could be implemented by one or more servers. The actual number of servers used to implement server 110 and how features are allocated among them will vary from one implementation to another, and may depend in part on the amount of data traffic that the system must handle during peak usage periods as well as during average usage periods.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method performed by a client device or system, the client device or system having one or more processors and memory storing one or more programs for execution by the one or more processors, the method comprising:
   at a first time, presenting a first webpage having a first style; and
   in response to a refresh request at a second time, presenting a second webpage having a second style that is distinct from the first style,
   wherein:
      the first style and second style are determined in accordance with a value of a user selected variable, the value automatically changing over time independent of user action; and
      the user selected variable has a first value at the first time and a second value distinct from the first value at the second time.

2. The method of claim 1, wherein the refresh request is generated automatically without any user action.

3. The method of claim 1, wherein presenting the second webpage includes refreshing the first webpage.

4. The method of claim 3, wherein refreshing the first webpage includes presenting content of the first webpage in accordance with the second style.

5. The method of claim 1, wherein content of the second webpage is content of the first webpage.

6. The method of claim 1, wherein the second webpage includes new content and at least a subset of content of the first webpage.

7. The method of claim 1, wherein the second webpage includes new content with respect to content of the first webpage.

8. A client device or system, comprising:
   one or more processors; and
   memory storing one or more programs for execution by the one or more processors, the one or more programs including instructions for:
      at a first time, presenting a first webpage having a first style; and
      in response to a refresh request at a second time, presenting a second webpage having a second style that is distinct from the first style,
      wherein:
         the first style and second style are determined in accordance with a value of a user selected variable, the value automatically changing over time independent of user action; and
         the user selected variable has a first value at the first time and a second value distinct from the first value at the second time.

9. The client device or system of claim 8, wherein the refresh request is generated automatically without any user action.

10. The client device or system of claim 8, wherein presenting the second webpage includes refreshing the first webpage.

11. The client device or system of claim 10, wherein the instructions for refreshing the first webpage include instructions for presenting content of the first webpage in accordance with the second style.

12. The client device or system of claim 8, wherein content of the second webpage is content of the first webpage.

13. The client device or system of claim 8, wherein the second webpage includes new content and at least a subset of content of the first webpage.

14. The client device or system of claim 8, wherein the second webpage includes new content with respect to content of the first webpage.

15. A non-transitory computer readable storage medium, storing one or more programs for execution by one or more processors of a client device or system, the one or more programs including instructions for:
   at a first time, presenting a first webpage having a first style; and
   in response to a refresh request at a second time, presenting a second webpage having a second style that is distinct from the first style,
   wherein:
      the first style and second style are determined in accordance with a value of a user selected variable, the value automatically changing over time independent of user action; and
      the user selected variable has a first value at the first time and a second value distinct from the first value at the second time.

16. The computer readable storage medium of claim 15, wherein the refresh request is generated automatically without any user action.

17. The computer readable storage medium of claim 15, wherein presenting the second webpage includes refreshing the first webpage.

18. The computer readable storage medium of claim 17, wherein the instructions for refreshing the first webpage include instructions for presenting content of the first webpage in accordance with the second style.

19. The computer readable storage medium of claim 15, wherein content of the second webpage is content of the first webpage.

20. The computer readable storage medium of claim 15, wherein the second webpage includes new content and at least a subset of content of the first webpage.

21. The computer readable storage medium of claim 15, wherein the second webpage includes new content with respect to content of the first webpage.

22. A computer-implemented method performed by a server system, the server system having one or more processors and memory storing one or more programs for execution by the one or more processors, the method comprising:
   at a first time, serving to a client device or system a first webpage having a first style; and
   in response to a refresh request at a second time, serving to the client device or system a second webpage having a second style that is distinct from the first style,
   wherein:
      the first style and second style are determined in accordance with a value of a user selected variable, the value automatically changing over time independent of user action; and
      the user selected variable has a first value at the first time and a second value distinct from the first value at the second time.

23. The method of claim 22, wherein content of the second webpage is content of the first webpage.

24. The method of claim 22, wherein the second webpage includes new content and at least a subset of content of the first webpage.

25. The method of claim 22, wherein the second webpage includes new content with respect to content of the first webpage.

26. A server system, comprising:
one or more processors; and
memory storing one or more programs for execution by the one or more processors, the one or more programs including instructions for:
at a first time, serving to a client device or system a first webpage having a first style; and
in response to a refresh request at a second time, serving to the client device or system a second webpage having a second style that is distinct from the first style,
wherein:
the first style and second style are determined in accordance with a value of a user selected variable, the value automatically changing over time independent of user action; and
the user selected variable has a first value at the first time and a second value distinct from the first value at the second time.

27. A non-transitory computer readable storage medium, storing one or more programs for execution by one or more processors of a server system, the one or more programs including instructions for:
at a first time, serving to a client device or system a first webpage having a first style; and
in response to a refresh request at a second time, serving to the client device or system a second webpage having a second style that is distinct from the first style,
wherein:
the first style and second style are determined in accordance with a value of a user selected variable, the value automatically changing over time independent of user action; and
the user selected variable has a first value at the first time and a second value distinct from the first value at the second time.

* * * * *